United States Patent [19]
Trompenaars et al.

[11] Patent Number: 5,621,271
[45] Date of Patent: Apr. 15, 1997

[54] DISPLAY DEVICE OF THE FLAT-PANEL TYPE COMPRISING AN ELECTRON TRANSPORT DUCT AND A SEGMENTED FILAMENT

[75] Inventors: Petrus H. F. Trompenaars; Edward C. Cosman; Edwin A. Montie; Theunis S. Baller; Nicolaas Lambert; Siebe T. De Zwart, all of Eindhoven, Netherlands

[73] Assignee: U.S. Philips Corporation, New York, N.Y.

[21] Appl. No.: 250,731

[22] Filed: May 27, 1994

Related U.S. Application Data

[63] Continuation-in-part of Ser. No. 210,962, Mar. 21, 1994, Pat. No. 5,442,253, and Ser. No. 53,980, Apr. 26, 1993, Pat. No. 5,347,199, which is a continuation of Ser. No. 954,949, Sep. 30, 1992, abandoned, which is a continuation of Ser. No. 637,039, Jan. 3, 1991, abandoned, which is a continuation-in-part of Ser. No. 528,677, May 24, 1990, abandoned, said Ser. No. 210,962, is a continuation of Ser. No. 830,951, Feb. 6, 1992, Pat. No. 5,313,136, which is a continuation of Ser. No. 528,677, May 24, 1990, abandoned.

[30] Foreign Application Priority Data

Jun. 2, 1993 [EP] European Pat. Off. ............... 93201566
Dec. 20, 1993 [EP] European Pat. Off. ............... 93203586

[51] Int. Cl.$^6$ ........................................................ H01J 29/70
[52] U.S. Cl. ............................. 313/422; 313/495; 313/496
[58] Field of Search ..................................... 313/422, 495, 313/496, 497, 103 R, 103 CM, 105 R, 105 CM

[56] References Cited

U.S. PATENT DOCUMENTS

| 5,313,136 | 5/1994 | Van Gorkom et al. | 313/422 |
| 5,347,199 | 9/1994 | Van Gorkom et al. | 313/422 |
| 5,386,175 | 1/1995 | Van Gorkom et al. | 313/422 |

FOREIGN PATENT DOCUMENTS

0436997  7/1991  European Pat. Off. .

Primary Examiner—Nimeshkumar Patel
Attorney, Agent, or Firm—Robert J. Kraus

[57] ABSTRACT

A display device comprising electron-transport ducts having entrance apertures for electrons and means for generating electrons and injecting electrons into the transport ducts via the entrance apertures. Measures have been taken to improve the picture quality. For example, the location of the entrance aperture is not the same for each transport duct, but instead shows a variation. This enables an improved control of the electron flow in the transport ducts to be achieved; in particular crosstalk between the transport ducts can be reduced.

49 Claims, 11 Drawing Sheets

DISPLAY DEVICE OF THE FLAT-PANEL TYPE COMPRISING AN ELECTRON TRANSPORT DUCT AND A SEGMENTED FILAMENT

CROSS-REFERENCES TO RELATED APPLICATIONS

This application is a continuation-in-part of U.S. patent application Ser. No. 08/210,962 filed on Mar. 21, 1994 (now U.S. Pat. No. 5,442,253) which is a continuation of U.S. patent application Ser. No. 07/830,951 filed on Feb. 6, 1992 (now U.S. Pat. No. 5,313,136 issued on May 17, 1994), which is a continuation of U.S. patent application Ser. No. 07/528,677 filed on May 24, 1990 (now abandoned); and is a continuation-in-part of U.S. patent application Ser. No. 08/053,980 filed on Apr. 26, 1993 (now U.S. Pat. No. 5,347,199), which is a continuation of U.S. patent application Ser. No. 07/954,949 filed on Sep. 30, 1992 (now abandoned), which is a continuation of U.S. patent application Ser. No. 07/637,039 filed on Jan. 3, 1991 (now abandoned), which is a continuation-in-part of U.S. patent application Ser. No. 07/528,677 filed on May 24, 1990, now abandoned.

BACKGROUND OF THE INVENTION

The invention relates to a display device having a vacuum envelope, said display device comprising an electroluminescent screen and a row of transport ducts for transporting electrons, means for generating electrons and injecting electrons into the transport ducts, means for applying potential differences across the transport ducts to transport electrons through said transport ducts by means of secondary emission, means for extracting electrons from the transport ducts and means for directing electrons towards the electroluminescent screen.

A display device of the type mentioned in the opening paragraph is described in EP-A 0 436 997. In EP-A 0 436 997, corresponding to U.S. Pat. No. 5,347,199 a description is given of a display device in which the means for generating and injecting electrons comprise a line cathode which generates electrons which are injected into the transport ducts by means of electrodes. In general, the aim is to obtain display devices which are constructed so that, in operation, the electron flows in the transport ducts do not deviate from a desired value or deviate so little that it is not disturbing or only to a very small degree. Variations in electron flows, both in one transport duct and between transport ducts, cause a deterioration of the picture quality.

SUMMARY OF THE INVENTION

It is an object of the invention to provide a display device of the type described in the opening paragraph, in which variations in the electron flows are precluded or reduced. Within the scope of the invention, it has been recognized that the cooperation between and mutual influencing of the means for generating electrons and injecting electrons into the transport ducts are of essential importance in this respect.

This recognition is elaborated in various aspects of the invention.

According to a first aspect of the invention, the display device is characterized in that the means for generating electrons comprise juxtaposed line cathodes.

If one line cathode is used as the source for all transport ducts in the display device, problems with the homogeneity of the image displayed are, for example, caused by a relatively great voltage drop across the line cathode (of the order of magnitude of, for example 100 volts). As a result thereof, the effectiveness with which electrons are generated by the line cathode and injected into the transport ducts varies along the line cathode. Due to this, differences between electron flows in different transport ducts occur. The homogeneity of the image displayed is adversely affected thereby. A long line cathode is also sensitive to vibrations. Vibrations cause changes in the position of the line cathode relative to the transport ducts, which may result in variations in the electron flows and hence a reduction of the homogeneity of the image displayed. By using a number of line cathodes, the voltage difference across each line cathode and the vibration sensitivity of each of the line cathode can be separately reduced. This results in an improved homogeneity of the image displayed and hence an improved picture display. In an embodiment of the display device in accordance with the first aspect of the invention, the display device comprises a mixing means which is located between the line cathodes and the transport ducts and which serves to mix electron flows generated by the line cathodes before the electrons are injected into the transport ducts.

This results in an improved homogeneity of the image displayed. Said mixing means causes the electrons generated by various line cathodes to be mixed before the electrons are injected into the transport ducts. When the electrons are mixed, a number of transport ducts receive electrons originating from more than one line cathode. By virtue thereof, electron-emission differences between line cathodes are less visible. In addition, adverse effects caused by differences in the positions of the line cathodes relative to the transport ducts are reduced.

Intensity differences caused by the fact that the line cathodes are discrete electron sources which are separated from each other are also reduced.

In a further embodiment of the display device in accordance with the first aspect of the invention, said display device comprises a first means for extracting electrons from the line cathodes via apertures which allow passage of electrons, and a transport surface which extends between said apertures and the transport ducts and which serves to transport electrons to the transport ducts by means of secondary emission and to mix electron flows.

The use of a transport surface enables a proper mixing of electrons to be achieved which are transported by means of secondary emission via said transport surface.

In an embodiment of the display device in accordance with the first aspect of the invention, the display device comprises at least two juxtaposed rows of line cathodes and the mixing means comprises one or more apertures for each row of line cathodes to allow passage of electrons and said mixing means comprises a means for joining electrons after they have passed through rows of apertures and directing them towards a row of entrance apertures of the transport ducts.

In this embodiment, the intensity and homogeneity of the electron flows can be increased. Each entrance aperture of a transport duct receives electrons originating from at least line cathodes pertaining to different rows..

Embodiments of the display device in accordance with a second aspect of the invention are characterized in that each transport duct has an entrance aperture for electrons and in that the location of the entrance aperture relative to the transport duct varies.

As mentioned hereinabove, transport ducts in which the electron transport takes place by means of secondary emission of electrons are known from European Patent Application EP-A 0 436 997. In said Patent Application EP-A 0 436 997, a description is given of a display device in which each transport duct has an entrance aperture which is identically located relative to the transport duct. One aspect of the invention is based on the insight that, as regards the location of the entrance apertures, it is advantageous to so construct the transport ducts that they are not identical, i.e. the location of the entrance apertures varies. In the display device in accordance with the state of the art, each transport duct has an entrance aperture which is identically located relative to the transport duct. As a result, the entrance apertures are arranged in a row. By so positioning the entrance apertures a signal or electron flow in a transport duct can adversely affect the electron flow in an adjacent transport duct in a relatively simple manner. This phenomenon, hereinafter also referred to as "crosstalk", causes undesired variations in the electron flows.

This phenomenon can be reduced by varying the location of the entrance apertures. This enables the distance between the entrance apertures to be increased and hence crosstalk to be reduced.

Preferably, entrance apertures of adjacent transport ducts are situated at different locations. This results in a substantial reduction of crosstalk.

In a further embodiment entrance apertures of adjacent transport ducts have different dimensions. By virtue thereof, systematic deviations of the cut-off voltage or of the emission of electrons into the apertures can be corrected.

Preferably, juxtaposed transport ducts have different line cathodes as respective sources of electrons. If juxtaposed transport ducts have the same line cathode as the source of electrons, a difference in emission between line cathodes may bring about disturbing light and dark bands in the image. If juxtaposed transport ducts have different line cathodes as the electron source, this phenomenon is less likely to occur and is less disturbing.

In display devices in accordance with a third aspect of the invention, electrodes are arranged around the entrance apertures and electrodes of adjacent apertures are separated from each other by electrically conductive and earthed surfaces. By virtue thereof, "crosstalk" caused by electrodes influencing each other is reduced. Also in such embodiments, preferably, the location of the entrance apertures varies and differs from that of adjacent entrance apertures. In this manner, more space is created for the conductive surfaces which has a favourable effect on the reduction of crosstalk.

Display devices in accordance with a fourth aspect of the invention are characterized in that the means for generating electrons and injecting electrons comprise an emission source and, for each channel, a control electrode and an anode which are situated on the entrance side and exit side, respectively, of an entrance aperture of a transport duct, and in that the display device comprises means for applying electric potentials to the control electrode and anode to control the electron flow in the transport duct, said control electrode and anode being provided on surfaces of an electrically insulating plate whose thickness is maximally twice the smallest dimension of the entrance aperture.

Preferably, the voltage on the anode is low. If the thickness of the plate is more than twice the smallest dimension of the entrance aperture, the voltage to be applied to the anode must be so high (for example <300 V) that electron transport in the transport duct is adversely affected.

Display devices in accordance with a fifth aspect of the invention are characterized in that the means for generating electrons and injecting electrons comprise a line cathode and each transport duct has an entrance aperture which is rectangular and oriented so as to extend parallel to the line cathode.

Vibrations in the line cathode affect the position of the line cathode relative to the entrance aperture. Such vibrations cause the number of electrons injected into the transport duct to vary. This variation leads to a deterioration of the quality of the image displayed. This effect is smaller for a rectangular entrance aperture than for, for example, a circular entrance aperture.

Display devices in accordance with a sixth aspect of the invention are characterized in that the means for generating electrons and injecting electrons comprise a line cathode and each transport duct has an entrance aperture, said entrance aperture being tapered in form, with the largest aperture facing the line cathode.

By virtue thereof, a higher percentage of electrons emitted by the line cathode is injected into the transport duct and the sensitivity to vibrations of the line cathode is reduced.

Aspects of the invention can be combined. However, this is not necessary, although some combinations offer further advantages.

BRIEF DESCRIPTION OF THE DRAWING

These and yet other aspects of the invention will be explained in greater detail by means of the following exemplary embodiments in which corresponding components generally bear the same reference numerals.

The drawing figures are diagrammatic and are generally not drawn to scale. In general, identical parts bear the same reference numerals.

DESCRIPTION OF THE PREFERRED EMBODIMENTS

Figure 1A:
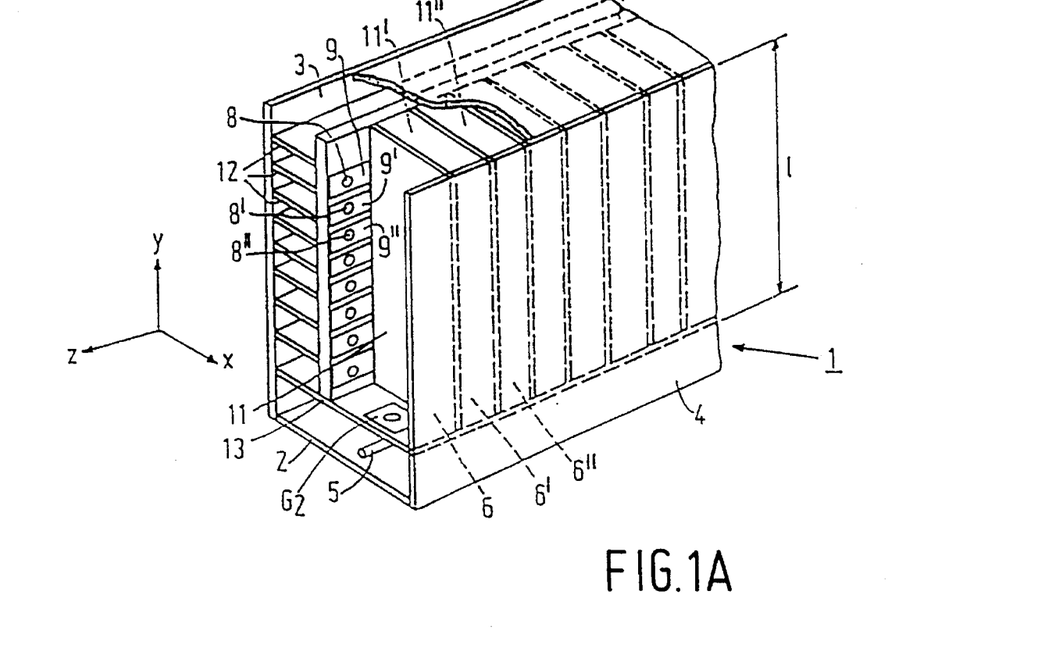
FIGS. 1A and 1B are a partly perspective view and a cross-sectional view, respectively, of a flat display device.
Figure 1B:
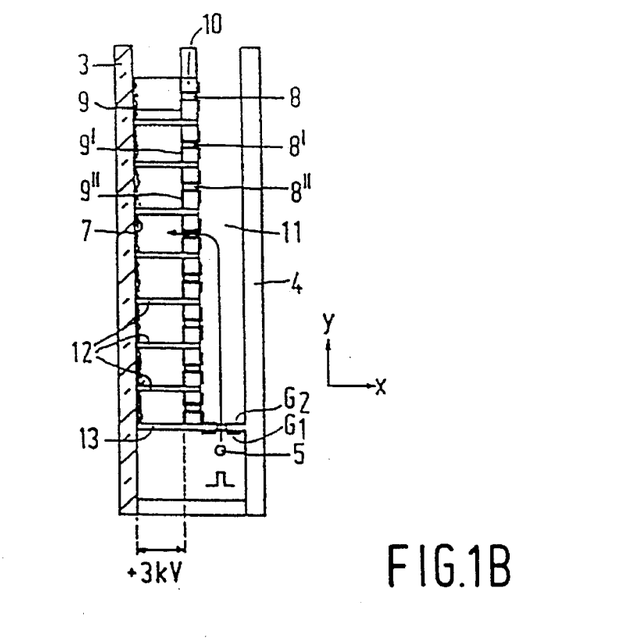

FIGS. 1A and 1B show a display device 1 of the flat-panel type in a partly perspective view and in a sectional view, respectively. Display device 1 has a transparent front wall (window) 3 and a rear wall 4 which is located opposite said front wall. An electroluminescent screen 7 is provided on said window. Transport ducts 11 for transporting electrons extend parallel to the rear wall in, for example, the y-direction. In this example, the electrons are transported through a transport duct by applying a potential difference across the transport duct. The display device further comprises a means for extracting electrons from the transport ducts 11 at previously determined locations. In this example, this means is formed by apertures 8 in cooperation with electrodes 9 on walls 10. The display device further comprises means for directing electrons towards the luminescent screen. In this example, said means comprise electrodes 9 and the luminescent screen 7, between which a potential difference is applied.

The display device comprises a means for injecting electrons into the transport ducts 11. In this example, said means comprises a system of cathodes 5 and electrodes $G_1$ and $G_2$. $G_1$ is a control electrode which, in this example, can be driven separately for each individual channel. $G_2$ is an electrode which is common to several channels. The line cathode and the $G_1$ and $G_2$ electrodes together form a triode. Electrons are injected into the transport ducts by heating the cathodes 5 and applying a potential difference between the cathodes 5 and electrode $G_2$. The display device further comprises control electrodes $G_1$ for controlling the intensity of the electron flows in the transport duct.

The display device described in EP-A 0 436 997 comprises one line cathode which forms a plurality, for example 600, of electron sources for the transport ducts by means of electrodes $G_1$ and $G_2$.

The disadvantage of the use of one line cathode is that in a display device comprising a relatively long line cathode (for example in excess of 0.10 meter) problems regarding the homogeneity of the displayed image occur. A difference in homogeneity shows itself in differences in intensity and/or colour of the image displayed.

It is an object of the invention to provide a display device in which the above problem is alleviated.

Figures 2A, 2B:
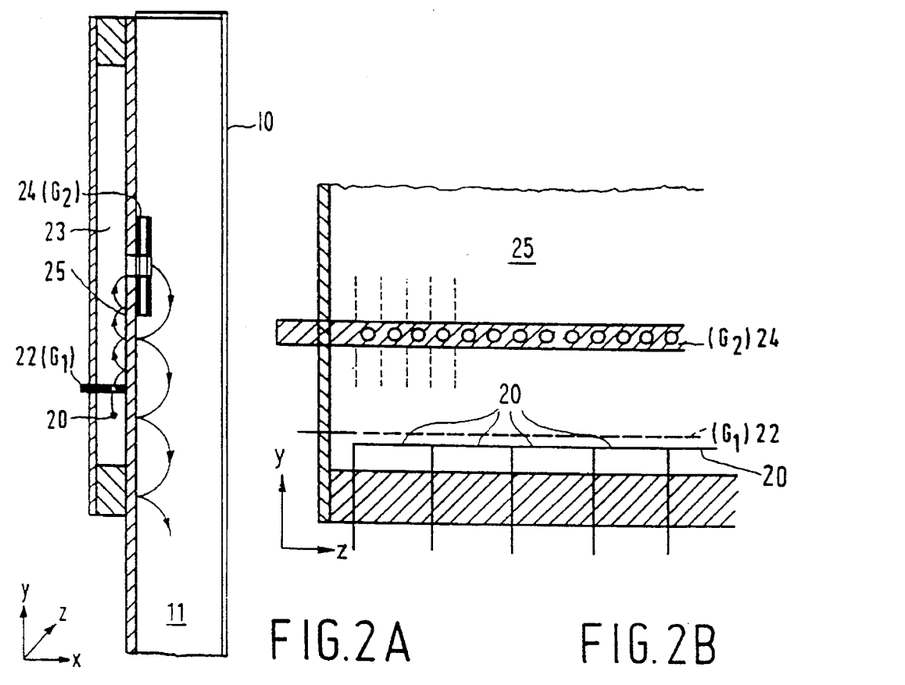
FIGS. 2A and 2B are sectional views of a detail of a flat display device in accordance with the invention.
Figure 3A:
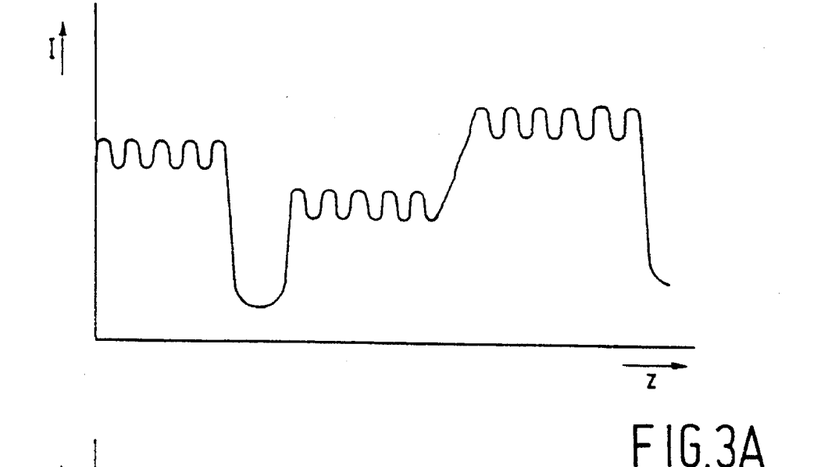
FIGS. 3A up to and including 3C graphically show the mixing of electron flows.
Figure 3B:
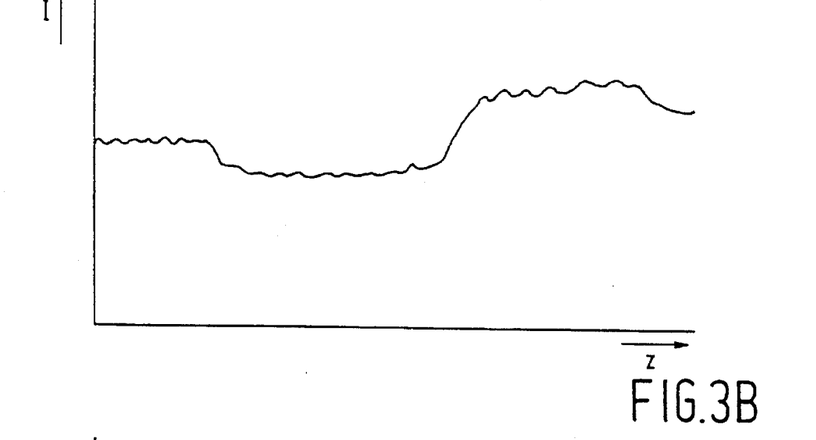
Figure 3C:
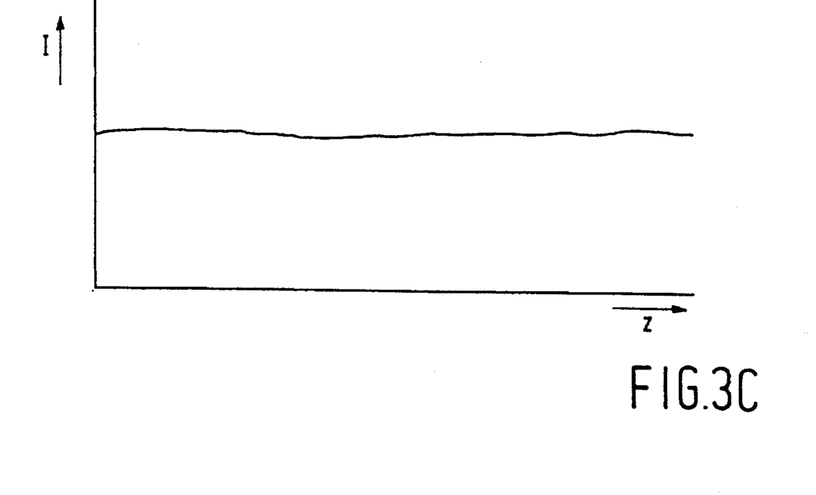

When a long line cathode is used, problems with regard to the homogeneity of the image displayed are caused, for example, by a relatively large voltage difference across the line cathode (of the order of magnitude of for example 100 volts). Due to this, at a constant voltage on $G_1$ and/or $G_2$, the effectiveness with which electrons are emitted by the line cathode and injected into the transport ducts varies along the line cathode, so that the electron flow in a transport duct is influenced and hence the homogeneity of the image displayed adversely affected. The voltage difference across the wire is not constant but depends on, inter alia, the temperature of the line cathode and is subject to ageing. Besides, a long line cathode is sensitive to vibrations. Vibrations cause changes in the position of the line cathode relative to the transport ducts, which may also lead to a reduction of the homogeneity of the image displayed. By using a number of line cathodes, the voltage difference across each of the line cathodes and the sensitivity to vibrations of the individual cathodes can be reduced. This results in an improved homogeneity of the image displayed. FIGS. 2 are sectional views, respectively, in an x-y plane (FIG. 2A) of the line cathodes and in an y-z plane, of a display device according to the invention. The display device comprises a row of line cathodes 20. In operation, said line cathodes are heated and electrons are injected into space 23 by means of electrode 22 ($G_1$). Electrode 22 has apertures to allow passage of electrons. A potential difference is applied between electrode 22 and electrode 24. Preferably, a means for mixing electron flows before they are injected into the transport ducts is present between said electrodes. Said mixing means comprises a transport surface 25. Secondary emission initiates an electron flow from electrode 22 to electrode 24 via transport surface 25. For a description of electron transport by means of secondary emission, reference is made to EP-A 0 436 977. Viewed in a direction from the apertures in electrode 22 to the apertures in electrode 24 the intensity differences decrease substantially. FIGS. 3A up to and including 3C illustrate this phenomenon. FIG. 3A shows, viewed in a direction parallel to the line cathodes, the electric current directly behind the apertures in electrode 22; the display device comprising three line cathodes. FIG. 3B shows the electric current halfway between electrodes 22 and 24, and FIG. 3C shows the electric current directly in front of electrode 24. It is clearly visible that transport surface 25 smoothens the differences between the electric currents. This has a positive effect on the image displayed.

Figures 4A, 4B:
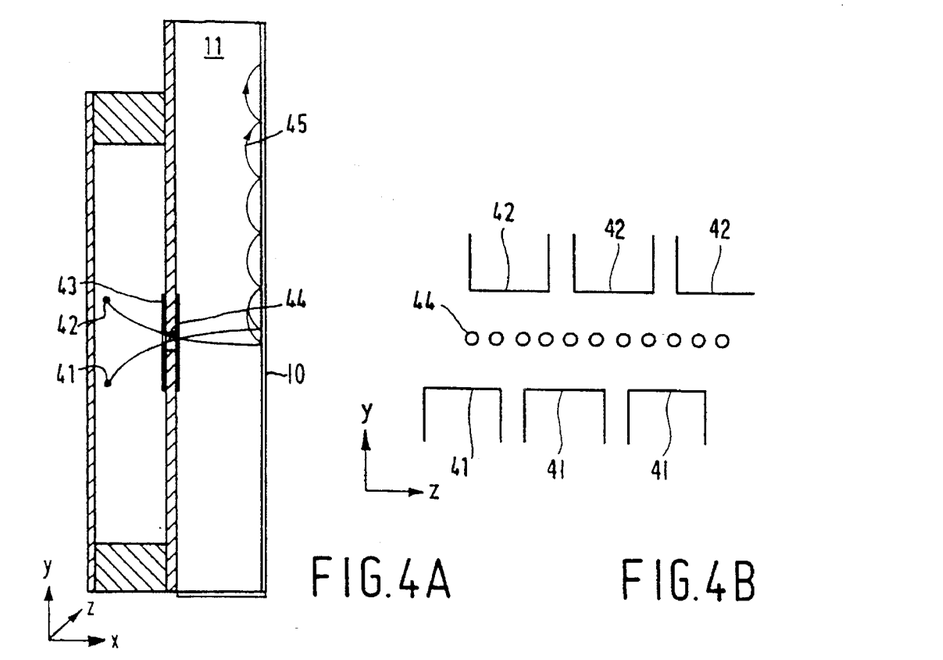
FIGS. 4A and 4B show a detail of a further example of a flat display device in accordance with the invention.

FIGS. 4A and 4B show a further example of the display device in accordance with the invention. In this example, the display device comprises two rows of line cathodes 41 and 42. Electrons 45 emitted by the line cathodes are injected into the transport ducts 11 by electrode 43 which comprises one aperture 44 for each transport duct. The line cathodes and the apertures 44 are arranged so that a substantially equal number of electrons passes through each aperture 44. In this example, the emitted electrons are thus directly injected into the transport ducts from the line cathodes without the electron flows being mixed by a secondary electron-emitting transport surface, as in FIG. 2A. A disadvantage of this arrangement is that a small difference in the position of the line cathodes 41 and/or 42 relative to the apertures 44 may cause relatively large intensity differences between the electron flows in the transport ducts.

Preferably, the electron flows are mixed to improve the homogeneity of the image displayed. FIGS. 2A and 2B, as described above, show an example of a display device in which the electron flows are mixed.

Figures 5A, 5B:
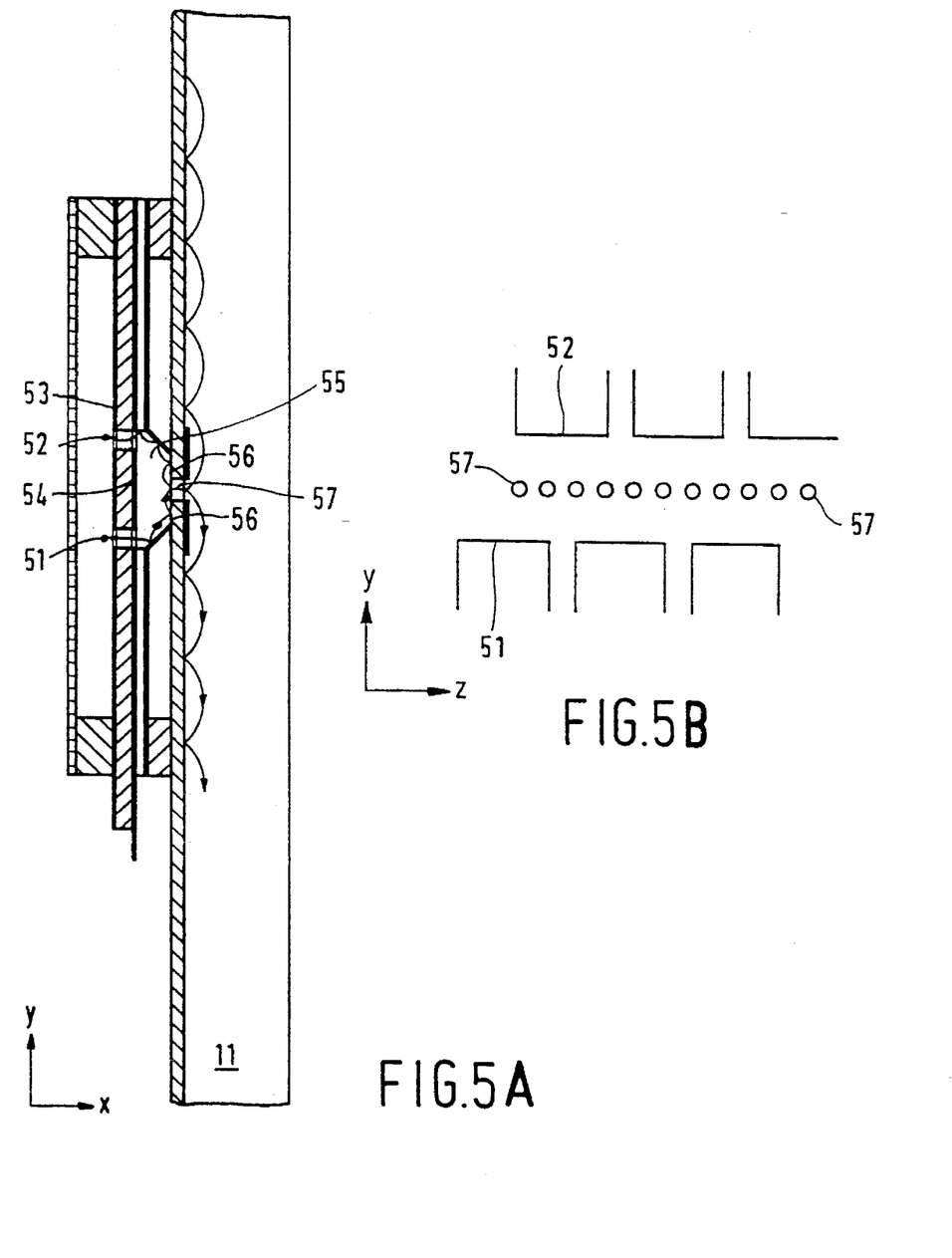
FIGS. 5A and 5B show a detail of a further example of a flat display device in accordance with the invention.

FIGS. 5A and 5B show a further example of the display device in accordance with the invention. In this example the display device comprises two rows of line cathodes 51 and 52. Electrons emitted by the line cathodes 51 and 52 are injected into space 55 by electrodes 53 and 54. Electrodes 53 and 54 have a number of apertures to allow passage of electrons. In space 55 the electron flows of both rows of line cathodes are mixed by means of secondary emission via walls 56 and directed towards apertures 57.

This aspect of the invention is not limited to the above-described examples. It is noted that this aspect of the invention relates to the part of the display device which serves to generate electrons and inject them into the transport ducts. In the examples, the transport of the electrons in the transport ducts takes place by means of secondary emission. As regards this aspect of the invention, electron transport may alternatively take place, for example, via electron beams.

In FIGS. 2A, 2B, 4A and 4B, the electrodes 22 (FIGS. 2A and 2B) and 43, 44 (FIGS. 4A and 4B) have a large number of apertures. The invention is not limited thereto. The electrodes 22, 43 and 44 may alternatively be provided with a slit-shaped aperture extending along the length of the row(s) of line cathodes or with more than one slit-shaped aperture. The line cathodes may be situated in many different ways with respect to the transport ducts, for example directly underneath the transport ducts (see for example FIGS. 1A and 1B), directly above the transport ducts, on the upper side of the transport ducts and next to the transport ducts (see for example FIGS. 2A and 2B) on the underside of the transport ducts and next to the transport ducts (see for example FIGS. 4A and 4B), next to the transport ducts and between the upper side and the underside of the transport ducts (see for example FIGS. 5A and 5B). The display device may alternatively comprise more than one system of transport ducts, for example a first system of transport ducts extending from the upper side of the display device halfway down the display device, with, for example, on the upper side of the display device a row of sources cooperating with the first system of transport ducts; and a second system of transport ducts extending from the underside of the display device halfway up the display device, a second row of sources which is located on the underside of the display device cooperating with the second system of transport ducts.

Figure 6A:
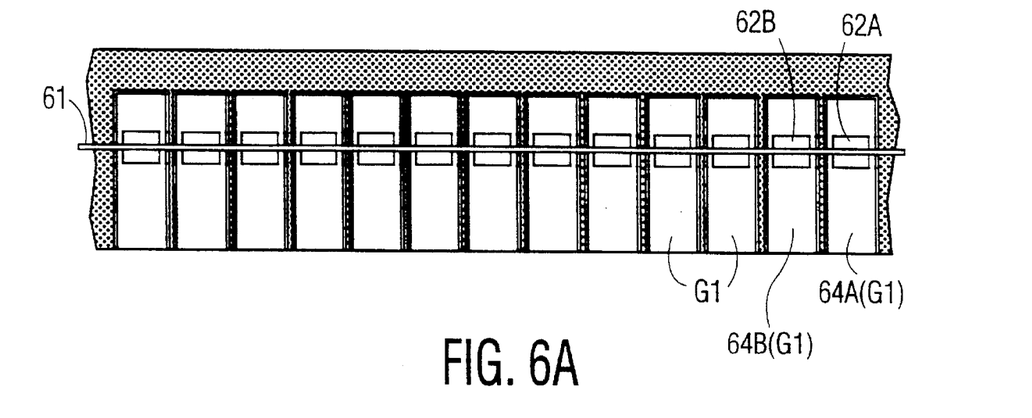
FIGS. 6A, 6B, 7A, and 7B show a detail of a display device, respectively, in a cross-sectional view of a transport duct (FIGS. 6A and 7A) and viewed in a direction transverse to a line cathode (FIGS. 6B and 7B).
Figure 6B:
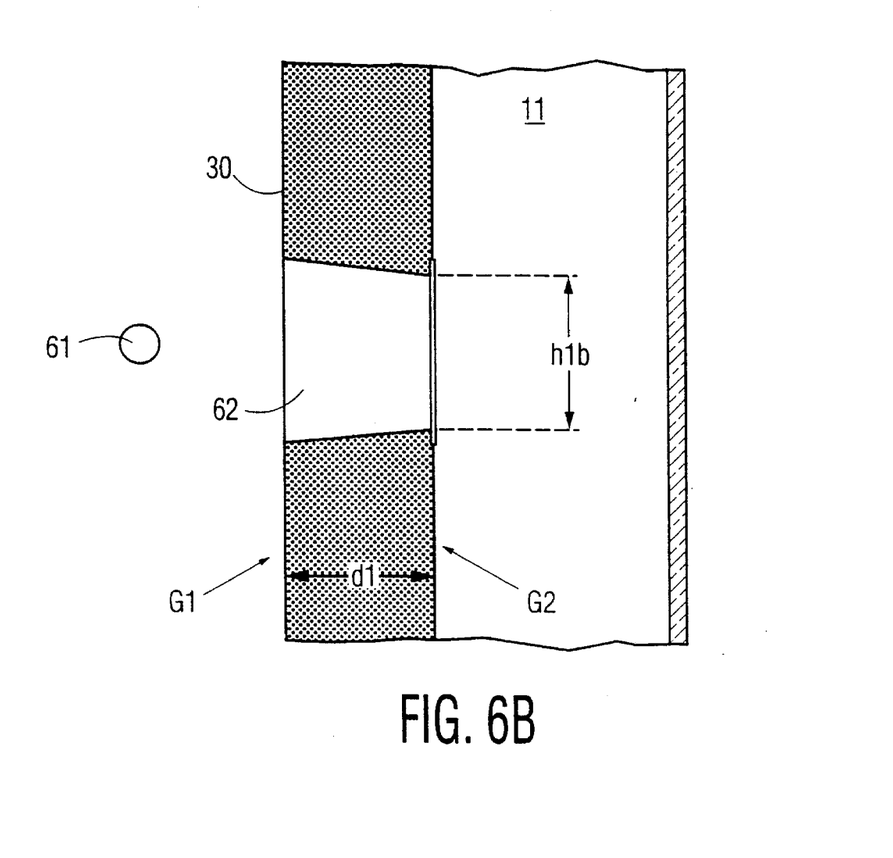
Figure 7A:
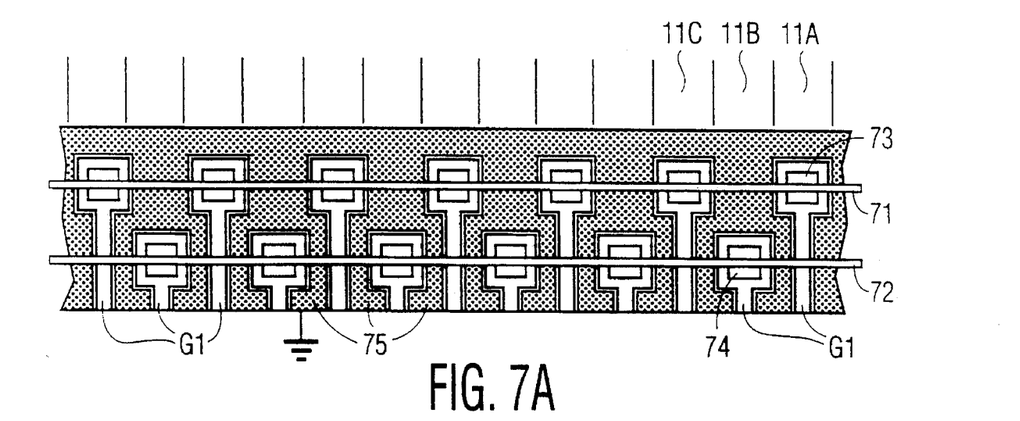
Figure 7B:
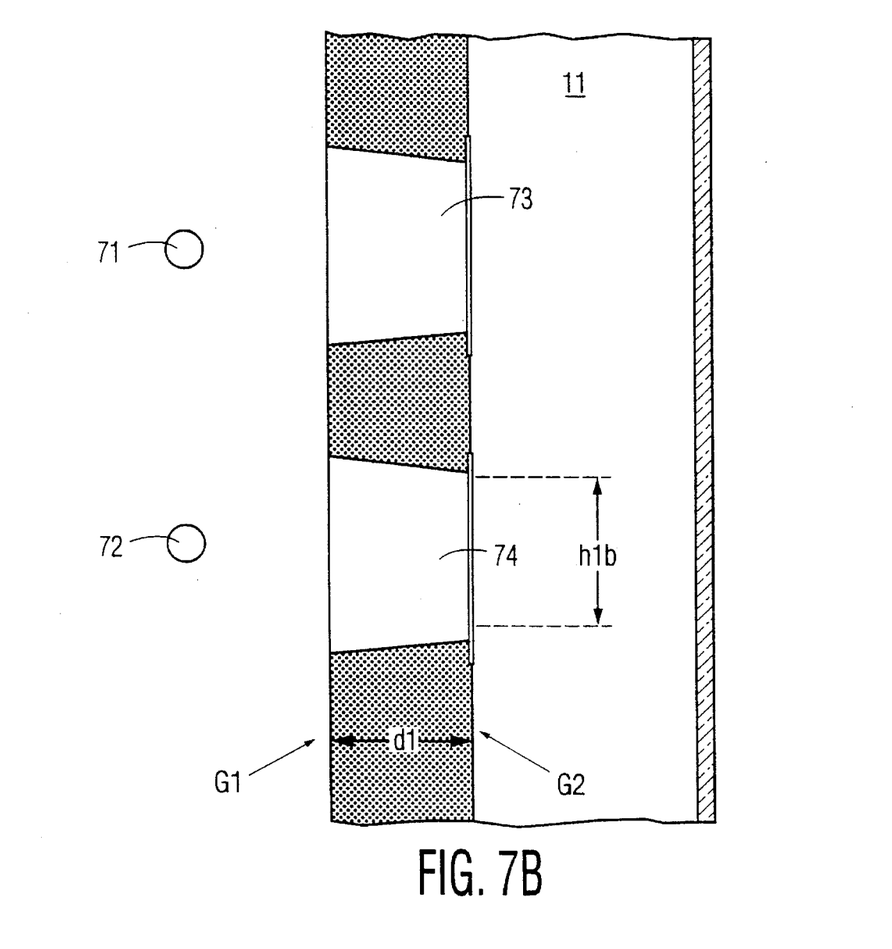

The number of electrons which can be extracted from a transport duct is governed by the number of electrons which is injected into the transport duct. Problems which arise during injecting electrons into the transport ducts are illustrated in FIGS. 6A and 6B. FIG. 6A shows, viewed in a direction transverse to a line cathode 61 and entrance apertures 62, a line cathode and the entrance apertures. FIG. 6B shows, in a cross-sectional view of a transport duct 11, the location of the entrance apertures 62. In said Figures, the location of the entrance apertures of each transport duct is identical. As the transport ducts are arranged so as to form a row, the entrance apertures also form a row. In this example, the display device comprises one long line cathode as the emission source for all apertures. The entrance apertures 62 are surrounded by electrodes 64. Voltages on said electrodes control the number of electrons which are injected into an entrance aperture. The number of electrons will hereinafter also be referred to as "the electron flow in the transport duct" or "the electron flow" for short. The accuracy of the electron flows in the different transport ducts and hence the quality of the image are adversely affected by a number of effects. Part of the electrons intended for aperture 62A will go to aperture 62B, and an electric voltage on electrode 64A induces a disturbing voltage on electrode 64B. This disturbing voltage may unintentionally affect the number of electrons injected into the transport duct corresponding with entrance aperture 62B. These phenomena will hereinafter also be referred to as "crosstalk" between two transport ducts. Crosstalk reduces the quality of the image displayed, more particularly the contrast of the image displayed. One aspect of the invention is based on the insight that crosstalk can be reduced by a variation in the location of the entrance apertures. This is shown in FIGS. 7A and 7B. FIG. 7A shows, transverse to the line cathodes and the entrance apertures, a detail of a display device comprising two line cathodes 71 and 72 and entrance apertures 73 and 74. FIG. 7B shows a cross-section of a transport duct. In FIG. 7B both entrance apertures of the relevant transport ducts are shown; in the display device each transport duct 11A, 11B, 11C etc., has one entrance aperture. As in the transport duct the electrons are transported over surfaces by means of secondary emission, the location of the entrance apertures relative to the transport duct and, more particularly, relative to the means for extracting electrons from the transport ducts has no influence or a negligible influence on the quantity of electrons extracted from the transport duct. Within the framework of the invention it has been recognized that this aspect is a characteristic of such transport ducts. In systems where an electron beam is transported by means of electron-optical electric fields, the entrance aperture is electron-optically imaged on an exit aperture. In such transport ducts, a change in the location of the entrance aperture causes the electron optical image to change and hence is of great consequence.

By varying the location of the entrance aperture, the distance between the entrance apertures 73 and 74 is increased without increasing the distance between the transport ducts, as a comparison between FIGS. 6A and 7A shows. As a result thereof, crosstalk between transport ducts 11A, 11B etc. is reduced, so that an improved picture quality can be attained.

FIGS. 6A up to and including 7B show embodiments of a display device in which the means for generating electrons comprise a line cathode. Also if for each entrance aperture one separate emission source, for example a punctiform cathode, is used, the aspects of the invention shown in FIGS. 6A up to and including 7B, which are not related to disturbing effects of vibrations of a line cathode, are useful to preclude crosstalk between transport ducts.

However, within the scope of the invention, the use of at least one line cathode which serves as the emission source for more than one transport duct is preferred. In comparison with a display device in which a separate emission source is used for each transport duct, this enables the number of electron sources to be reduced, allowing, in general, a simpler and better control of the electron flows in the transport ducts and resulting in fewer problems regarding display devices which are rejected during the manufacture and/or the homogeneity of the image displayed.

The disadvantages of the use of only one line cathode have been system forth hereinabove. The problems connected with these disadvantages can be reduced by employing a number of line cathodes as described above.

FIGS. 6A up to and including 7B also show further aspects of the invention. The $G_1$ and $G_2$ electrodes are situated on the entrance side and the exit side, respectively, of the entrance apertures. Both electrodes are provided on an electrically insulating plate. The thickness d1 of said plate is less than twice the smallest dimension h1b. If the thickness is more than twice said dimension, the voltage to be applied to electrode $G_2$ is so high that the injection of electrons into the transport duct and the transport of electrons in the transport duct are hampered. In this example, d1 is 550 µm and h1b is 800 µm. The entrance aperture is rectangular, with its largest dimension facing the line cathode. By virtue thereof, the percentage of electrons emitted by the line cathode which is injected into the transport duct is increased and the sensitivity to vibrations of the line cathode is reduced. The entrance apertures and extend parallel to the line cathode. In comparison with, for example, circular entrance apertures this results in a reduced sensitivity to vibrations of the line cathode.

FIG. 7A further shows that an electrically conductive layer 75 which is connected to earth is provided between the electrodes $G_1$. This reduces the electrical crosstalk between the different electrodes $G_1$.

The conductive layer 75 can alternatively be connected to a fixed electric potential.

Figure 7C:
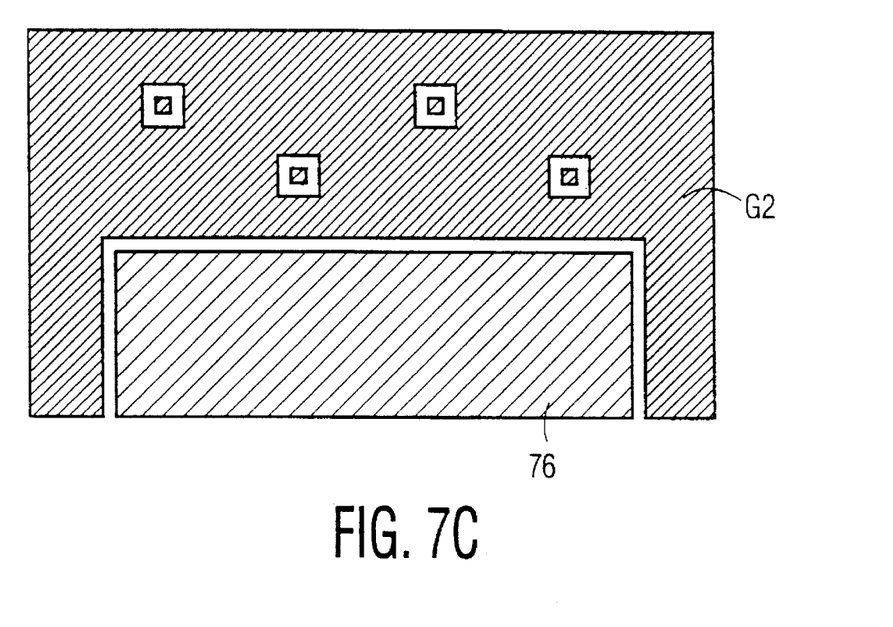
FIGS. 7C, 7D, 7E and 7F show further aspects of embodiments of the invention.

FIG. 7C is a top view of the electrode G2 which is common to a number of apertures. In the vicinity of said electrode G2 there is also provided an electrically conductive layer 76 which is earthed or connected to a fixed electric potential.

The G1 electrodes are control electrodes which modulate the emission of electrons from the wire cathode by means of a negative accelerating voltage $V_{o1}$. An electrode G2 which produces a positive accelerating voltage $V_{o2}$ is situated behind electrode G1. Apertures corresponding to a transport duct are provided in both electrodes. The emission is modulated per channel and each channel has an individual G1 electrode. The electrode G2 is common to a number of channels.

The electrode G1 is driven by high-frequency video signals. A great voltage swing to modulate the emission is undesirable. The current-voltage characteristic is optimal when the so-called cut-off voltage (=the voltage at zero emission) is low and the slope is steep.

Figure 7D:
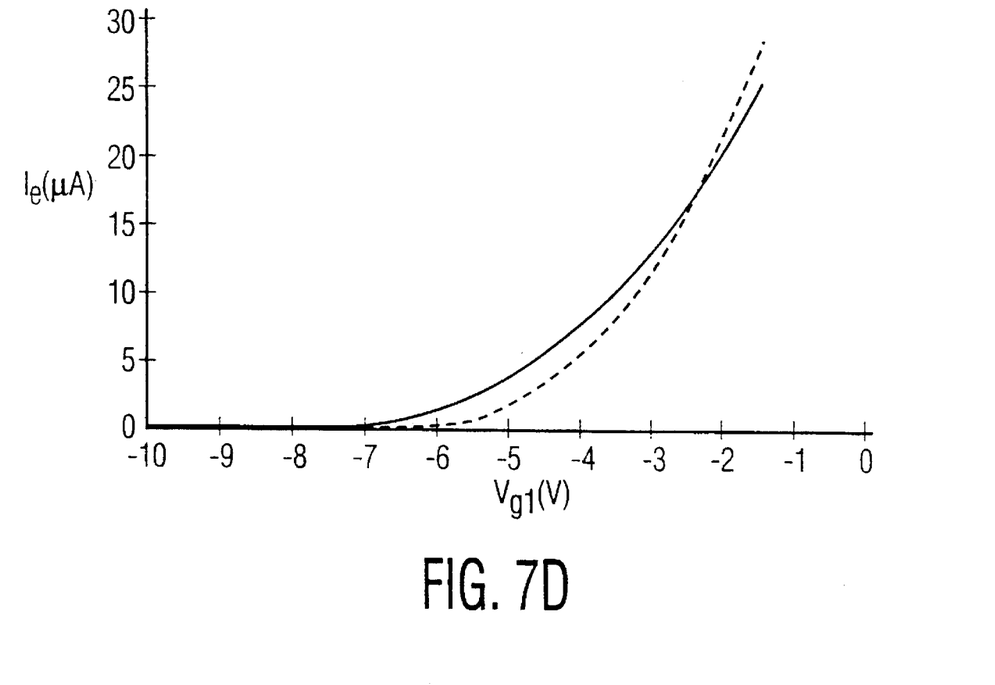

FIG. 7D compares the current-voltage characteristic of round apertures, 1.2 mm across, in G1 (solid-line curve) to the current-voltage characteristic of rectangular apertures having dimensions of 1.2 mm×0.5 mm, the longest dimension being situated along the wire cathode (broken-line curve). The voltage on the G1 electrode is plotted on the horizontal axis ($V_{01}$), the emission through the hole in the G1 electrode (Ie) is plotted on the vertical axis. It is clearly visible that rectangular apertures require a lower (absolute) voltage on the G1 electrode and that the slope of the curve is steeper.

Figure 7E:
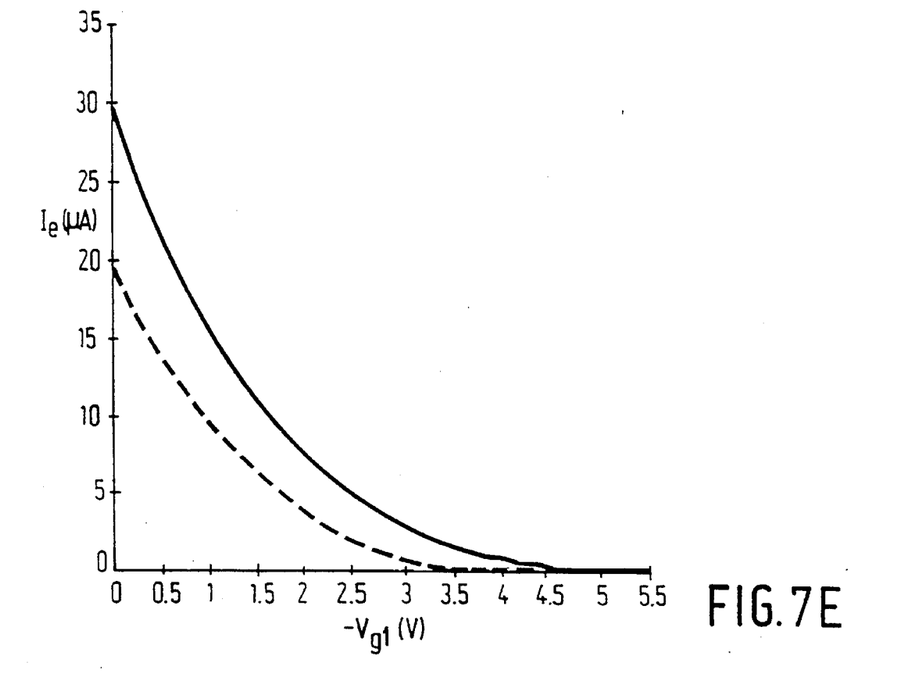
Figure 7F:
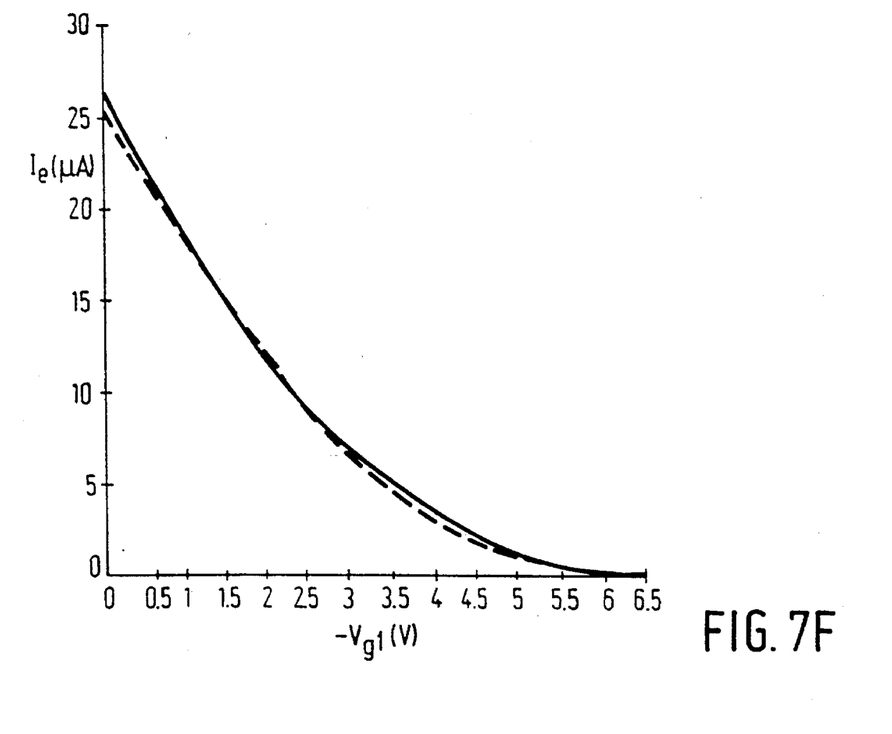

FIGS. 7E and 7F show the effect of "crosstalk" between adjacent channels. The voltage on the G1 electrode ($V_{01}$) is plotted on the horizontal axis, and the emission through the hole in the G1 electrode (Ie) is plotted on the vertical axis. FIG. 7E depicts a situation in which all apertures are arranged in a row (an example thereof is shown in FIG. 6A). Preferably, the emission into an aperture in a G1 electrode is not or hardly governed by the voltage on an adjacent G1 electrode. In the opposite case, the contrast of the image displayed is reduced.

FIG. 7E shows two curves, a solid-line curve and a broken-line curve. The solid-line curve represents the emission through an aperture in a G1 electrode when an electric potential of −10 V is applied to both adjacent G1 electrodes, the broken-line curve represents the emission when an electric potential of −20 V is applied to both adjacent G1 electrodes. It is clearly visible that the magnitude of the potential on adjacent G1 electrodes has a considerable effect on the emission.

FIG. 7F depicts the emission (vertical axis) through an aperture in a G1 electrode as a function of the electric potential on the G1 electrode (horizontal axis), the apertures in the G1 electrode being staggered relative to each other. The solid-line curve and the broken-line curve substantially coincide. The on-off characteristic is much better defined now. Influencing the emission into one channel by means of the voltage on an adjacent G1 electrode may for example have the effect that horizontal lines have another intensity than vertical lines. The reason for this is that if a horizontal line (i.e. extending transversely to the direction of the transport ducts) is displayed, the voltage on a number of juxtaposed G1 electrodes is identical, namely approximately of the order of 0 V, whereas during displaying a vertical line (i.e. along a transport duct) one G1 electrode is at a voltage of approximately 0 V, while the adjacent G1 electrodes all are at a voltage of approximately −10 V or lower.

In addition to the above-mentioned effect (the possible dependence of the emission of electrons into an aperture of a G1 electrode on the electric voltages on adjacent G1 electrodes) there is a second effect. It has been found that when the apertures in the G1 electrodes are arranged in a row (as shown in FIG. 6A) the required cut-off voltage is higher than when the apertures are staggered relative to each other (as shown in, for example, FIG. 7A). As mentioned hereinabove, the cut-off voltage is preferably as small as possible.

Figure 8:
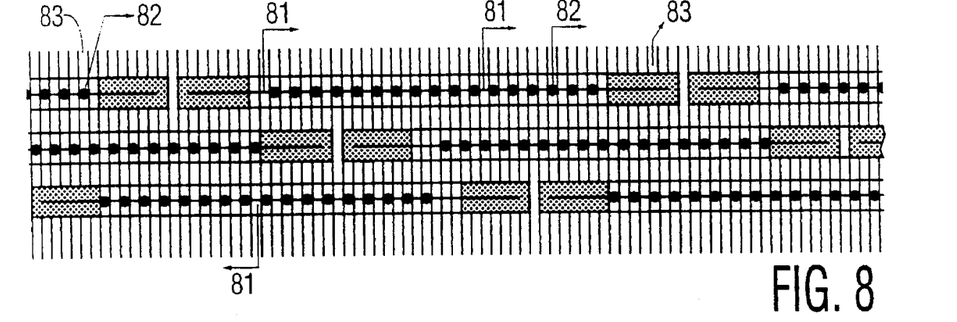
FIGS. 8, 9, 10, 11, 12, 13, 14, and 15 show details of further embodiments of the display device in accordance with the invention.

FIGS. 8 up to and including 15 show a number of possible further embodiments comprising a number of line cathodes.

In FIG. 8 use is made of a number of juxtaposed line cathodes 81. The length of the line cathodes is small and microphonism is reduced. Of each line cathode only the central portion (between the hatched portions) is used as an emission source. Entrance apertures 82 of transport ducts 83 are only located opposite said central portion. In said portion the temperature variation is small.

Figure 9:
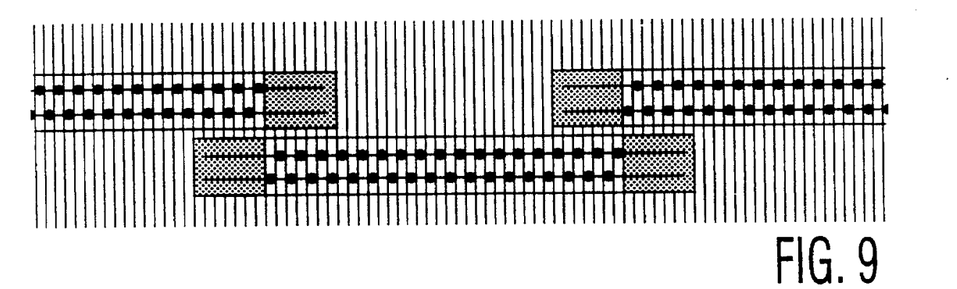

FIG. 9 shows a combination of the embodiments of FIGS. 7 and 8. In these and subsequent Figures (with the exception of FIG. 10) juxtaposed transport ducts always have a different line cathode as the source for electrons. This is a preferred embodiment. If juxtaposed transport ducts have the same line cathode as the source for electrons, emission differences between line cathodes may bring about disturbing light and dark bands in the image. If juxtaposed transport ducts have different line cathodes as the electron source, this phenomenon is less likely to occur and is less disturbing.

Figure 10:
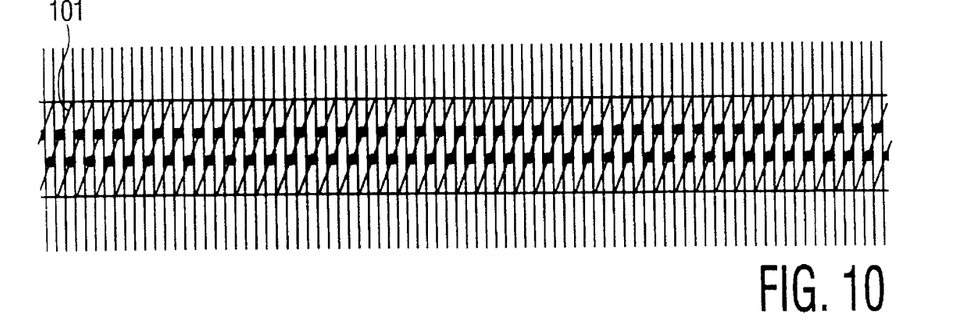
Figure 11:
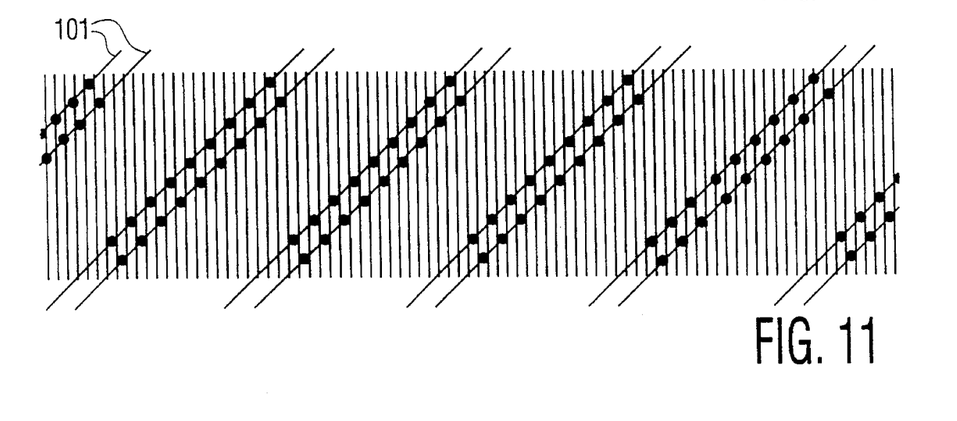

FIG. 10 shows a number of obliquely juxtaposed line cathodes 101. FIG. 11 shows a variant thereof. In said Figures, the vertical lines represent the transport ducts, the dots represent the entrance apertures of the transport ducts and the lines interconnecting said dots represent the line cathodes.

Figure 12:
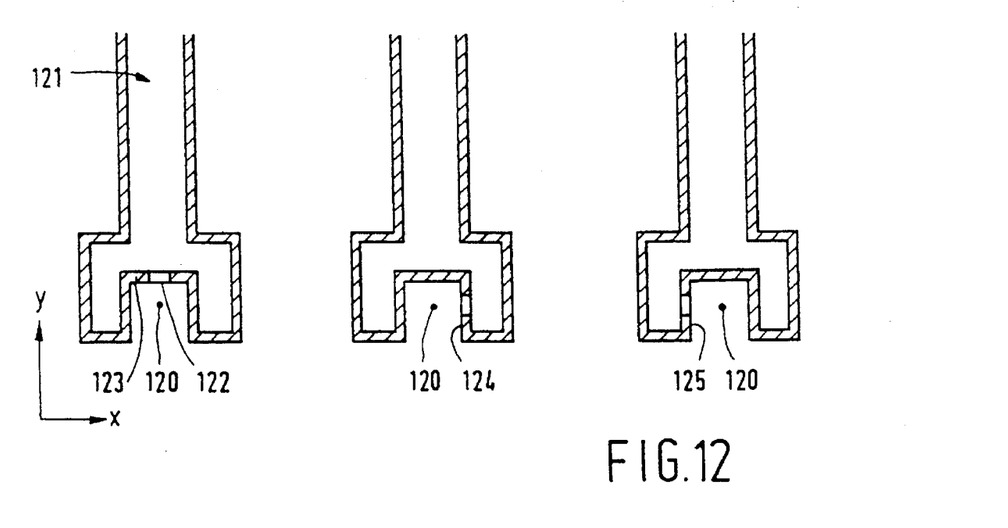

FIG. 12 shows a further variant. In the examples described above, the entrance apertures are located in one plane. FIGS. 12A, B, and C show respective cross-sections of three adjacent transport ducts comprising entrance apertures which are situated in different planes. By virtue thereof, the distance between apertures can be further increased and hence crosstalk reduced. The entrance aperture 122 for the transport duct 121 is situated in side wall 123. For adjacent transport ducts the respective entrance apertures are situated in side walls 124 and 125. Line cathode 120 is also shown.

Figure 13:
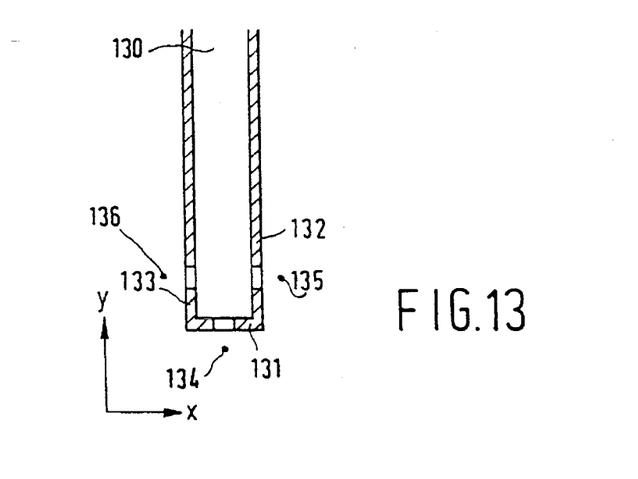

FIG. 13 shows a further variant. Each transport duct 130 comprises an entrance aperture in wall 131 or 132 or 133. For each system of entrance apertures the display device comprises a line cathode 134, 135 or 136, as shown in FIG. 13.

It will be obvious that within the scope of the invention many variations are possible.

Figure 14:
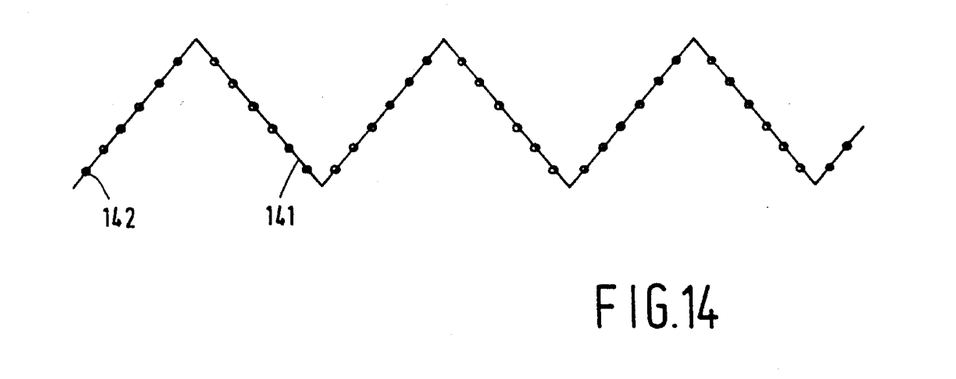

For example, FIG. 14 shows an arrangement in which line cathodes 141 are used which are arranged in a zigzag way relative to the entrance apertures 142.

Figure 15:
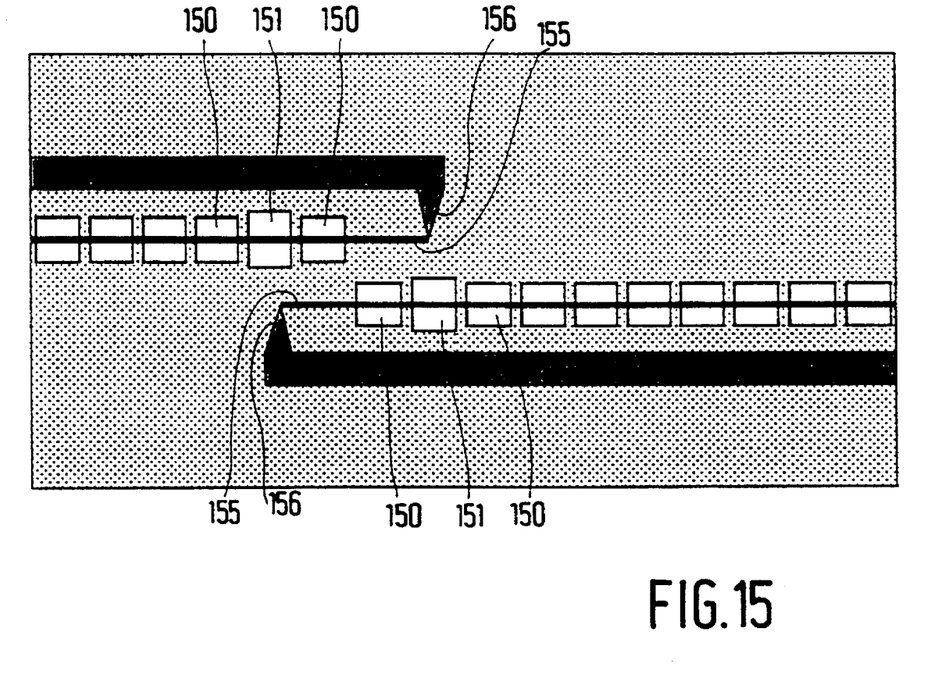

FIG. 15 shows yet another embodiment of the display device in accordance with the invention. This embodiment is characterized in that closely spaced apertures for allowing passage of the electrons have different dimensions. Apertures 150 and 151 in the adjacent G1 electrodes have different dimensions. The wire cathodes 155 are supported by supporting elements 156. Said supporting elements influence the electric fields in the vicinity of the apertures 151 and hence the emission from the wire cathodes 155 into the apertures 151. This causes a deviation of the cut-off voltage for the apertures 151 relative to the apertures 150. This systematic deviation is corrected in this exemplary embodiment by selecting the dimensions of the holes 151 so that they are different from the dimensions of the holes 150. In this example the apertures 151 are slightly larger than the apertures 150. This example gives one possible embodiment. In another embodiment, for example, the size of the apertures is a function of the distance between the aperture and the beginning or end of the wire cathode. In operation, a temperature difference may occur along the wire cathode.

This results in a difference in emission along the wire cathode, such that in general the emission is greatest halfway between the supporting points and decreases towards said supporting points. This systematic variation in emission can be corrected by varying the size of the apertures in such a manner that the size of the apertures increases from the center of the wire cathode towards the supporting points.

We claim:

1. A display device having a vacuum envelope, said display device comprising an electroluminescent screen and a row of transport ducts for transporting electrons, means for generating electrons and injecting electrons into the transport ducts, means for applying potential differences across the transport ducts to transport electrons through said transport ducts by means of secondary emission, means for extracting electrons from the transport ducts aid means for directing electrons towards the electroluminescent screen, characterized in that the means for generating electrons comprise juxtaposed line cathodes.

2. A display device as claimed in claim 1, characterized in that the display device comprises a mixing means which is located between the line cathodes and the transport ducts and which serves to mix electron flows generated by the line cathodes before the electrons are injected into the transport ducts.

3. A display device as claimed in claim 2, characterized in that the display device comprises a means for extracting electrons from the line cathodes via apertures which allow passage of electrons, and a transport surface which extends between said apertures and the transport ducts and which serves to transport electrons to the transport ducts by means of secondary emission and to mix electron flows.

4. A display device as claimed in claim 3, characterized in that the display device comprises at least two juxtaposed rows of line cathodes, and in that the mixing means comprises one or more apertures for each row of line cathodes to allow passage of electrons, and in that said mixing means comprises a means for joining the electrons after they have passed through rows of apertures and directing them towards a row of entrance apertures of the transport ducts.

5. A display device as claimed in claim 1, 2, 3 or 4, characterized in that each transport duct has an entrance aperture for electrons, and in that the location of each entrance aperture relative to the respective transport duct differs with respect to another one of said aperture.

6. A display device as claimed in claim 5, characterized in that entrance apertures of adjacent transport ducts are situated at different locations.

7. A display device as claimed in claim 1, 2, 3 or 4, characterized in that juxtaposed transport ducts have a different line cathode as the source of electrons.

8. A display device having a vacuum envelope, said display device comprising an electroluminescent screen and a row of transport ducts for transporting electrons, means for generating electrons and injecting electrons into the transport ducts, means for applying potential differences across the transport ducts to transport electrons through said transport ducts by means of secondary emission, means for extracting electrons from the transport ducts and means for directing electrons towards the electroluminescent screen, characterized in that each transport duct has an entrance aperture for electrons and in that the location of each entrance aperture relative to the respective transport duct differs with respect to another one of said aperture.

9. A display device as claimed in claim 8, characterized in that entrance apertures of adjacent transport ducts are situated at different locations.

10. A display device as claimed in claim 8, characterized in that entrance apertures of adjacent transport ducts have different dimensions.

11. A display device as claimed in claim 8 or 9, characterized in that the entrance apertures are not located in one plane.

12. A display device as claimed in claim 8, 9, or 10, characterized in that the means for generating electrons comprise at least one line cathode which serves as the emission source for more than one transport duct.

13. A display device having a vacuum envelope, said display device comprising an electroluminescent screen and a row of transport ducts for transporting electrons, means for generating electrons and injecting electrons into the transport ducts, means for applying potential differences across the transport ducts to transport electrons through said transport ducts by means of secondary emission, means for extracting electrons from the transport ducts and means for directing electrons towards the electroluminescent screen, characterized in that each transport duct has an entrance aperture for electrons, in that electrodes are arranged around the entrance apertures, and in that the electrodes arranged around adjacent ones of the entrance apertures are separated from each other by electrically connected, conductive surfaces which are adapted for connection to a common reference potential.

14. A display device as claimed in claim 13, characterized in that the location of each entrance aperture relative to the respective transport duct differs with respect to another one of said apertures.

15. A display device as claimed in claim 14, characterized in that entrance apertures of adjacent transport ducts are situated at different locations.

16. A display device having a vacuum envelope, said display device comprising an electroluminescent screen and a row of transport ducts for transporting electrons, means for generating electrons and injecting electrons into the transport ducts, means for applying potential differences across the transport ducts to transport electrons through said transport ducts by means of secondary emission, means for extracting electrons from the transport ducts and means for directing electrons towards the electroluminescent screen, characterized in that the means for generating electrons and injecting electrons comprise an emission source and, for each transport duct, a control electrode and an anode which are situated on the entrance side and exit side, respectively, of an entrance aperture of said duct, and in that the display device comprises means for applying electric potentials to the control electrode and anode to control the electron flow in the transport duct, said control electrode and anode being provided on surfaces of an electrically insulating plate whose thickness is maximally twice the smallest dimension of the entrance aperture.

17. A display device having a vacuum envelope, said display device comprising an electroluminescent screen and a row of transport ducts for transporting electrons, means for generating electrons and injecting electrons into the transport ducts, means for applying potential differences across the transport ducts to transport electrons through said transport ducts by means of secondary emission, means for extracting electrons from the transport ducts and means for directing electrons towards the electroluminescent screen, characterized in that the means for generating electrons and injecting electrons comprise a line cathode and each transport duct has an entrance aperture which is rectangular and oriented so as to extend parallel to the line cathode.

18. A display device having a vacuum envelope, said display device comprising an electroluminescent screen and a row of transport ducts for transporting electrons, means for generating electrons and injecting electrons into the transport ducts, means for applying potential differences across the transport ducts to transport electrons through said transport ducts by means of secondary emission, means for extracting electrons from the transport ducts and means for directing electrons towards the electroluminescent screen, characterized in that the means for generating electrons and injecting electrons comprise a line cathode and each transport duct has an entrance aperture which flares towards the line cathode.

19. A display device comprising a luminescent screen, a plurality of transport ducts, means for controllably providing electrons in the transport ducts, means for promoting propagation of the electrons within the transport ducts by secondary emission, means for extracting electrons from selected locations along the transport ducts, and means for directing the extracted electrons toward the screen, said means for controllably providing electrons in the transport ducts comprising a plurality of juxtaposed line cathodes.

20. A display device as in claim 19 where the plurality of juxtaposed line cathodes include first and second line cathodes which are arranged along a common line.

21. A display device as in claim 19 where the plurality of juxtaposed line cathodes include first and second line cathodes which are arranged along substantially parallel lines.

22. A display device as in claim 19 including mixing means disposed between the line cathodes and the transport ducts for mixing electrons from first and second ones of said line cathodes before said electrons are provided in the transport ducts.

23. A display device as in claim 22 where the mixing means comprises a secondary emissive transport surface disposed along a path of electron propagation from the first and second line cathodes to the transport ducts.

24. A display device as in claim 22 where the mixing means comprises a plurality of entrance apertures in respective ones of the transport ducts, each of said entrance apertures receiving electrons from proximately disposed, first and second ones of said line cathodes.

25. A display device as in claim 19 where each of the plurality of transport ducts includes an entrance aperture for the passage of electrons from at least one of the line cathodes, the locations of different ones of said apertures relative to their respective transport ducts differing from one another.

26. A display device as in claim 25 where the locations of the entrance apertures in adjacent ones of the transport ducts differ from one another.

27. A display device as in claim 25 where said locations differ in a direction along which the electrons propagate in the transport ducts.

28. A display device as in claim 19 where adjacent ones of the transport ducts receive electrons from different ones of the line cathodes.

29. A display device as in claim 19 where each of the plurality of transport ducts includes an entrance aperture for the passage of electrons from at least one of the line cathodes, the areas of the entrance apertures in adjacent ones of the transport ducts differing from one another.

30. A display device as in claim 19 where each of the plurality of transport ducts includes an entrance aperture for the passage of electrons from at least one of the line cathodes, different ones of said apertures being located in different planes.

31. A display device as in claim 19 where at least several of the plurality of transport ducts include respective entrance apertures which are disposed for passing into said ducts electrons from a common one of the line cathodes.

32. A display device as in claim 19 where each of said plurality of transport ducts includes a wall having an entrance aperture for the passage of electrons from at least one of the line cathodes, and where the means for controllably providing electrons comprises a plurality of electrodes disposed around respective ones of said apertures, surfaces of said wall disposed between adjacent ones of said electrodes comprising a conductive material and being adapted for connection to a common reference potential.

33. A display device as in claim 32 where the common reference potential is ground potential.

34. A display device as in claim 32 where the locations of different ones of said apertures relative to their respective transport ducts differ from one another.

35. A display device as in claim 34 where the locations of the entrance apertures in adjacent ones of the transport ducts differ from one another.

36. A display device as in claim 32 where each of the plurality of electrodes comprises:

a. a first electrode element disposed on a first side of the respective wall; and b. a second electrode element disposed on a second side of the respective wall.

37. A display device as in claim 36 where each of the first electrode elements comprises a control electrode and where each of the second electrodes comprises an anode, said display device including means for applying respective electric potentials to said control electrode and to said anode to control the electron flow in the respective transport duct.

38. A display device as in claim 32 where said wall has a thickness which is maximally twice the smallest dimension of the respective entrance aperture.

39. A display device as in claim 32 where the locations of different ones of said apertures relative to their respective transport ducts differ from one another.

40. A display device as in claim 32 where adjacent ones of the transport ducts receive electrons from different ones of the line cathodes.

41. A display device as in claim 32 where at least several of the plurality of transport ducts include respective entrance apertures which are disposed for passing into said ducts electrons from a common one of the line cathodes.

42. A display device as in claim 19 where each of the plurality of transport ducts includes a wall having a rectangular entrance aperture for the passage of electrons from at least one of the line cathodes, a longer dimension of each said aperture extending in a direction substantially parallel to said at least one line cathode.

43. A display device as in claim 42 where the locations of different ones of said apertures relative to their respective transport ducts differ from one another.

44. A display device as in claim 42 where adjacent ones of the transport ducts receive electrons from different ones of the line cathodes.

45. A display device as in claim 42 where at least several of the plurality of transport ducts include respective entrance apertures which are disposed for passing into said ducts electrons from a common one of the line cathodes.

46. A display device as in claim 19 where each of the plurality of transport ducts includes a wall having an entrance aperture for the passage of electrons from at least one of the line cathodes, each of said entrance apertures defining an area which widens with decreasing distance to the at least one line cathode.

47. A display device as in claim 46 where the locations of different ones of said apertures relative to their respective transport ducts differ from one another.

48. A display device as in claim 46 where adjacent ones of the transport ducts receive electrons from different ones of the line cathodes.

49. A display device as in claim 46 where at least several of the plurality of transport ducts include respective entrance apertures which are disposed for passing into said ducts electrons from a common one of the line cathodes.

* * * * *